United States Patent [19]

Rudd

[11] Patent Number: 4,906,805

[45] Date of Patent: Mar. 6, 1990

[54] METHOD AND APPARATUS FOR HIGH FREQUENCY ELECTRICAL CAST WELDING AND SURFACE HARDENING

[76] Inventor: Wallace C. Rudd, 229 Valley Rd., New Canaan, Conn. 06840

[21] Appl. No.: 244,176

[22] Filed: Sep. 14, 1988

[51] Int. Cl.$^4$ .......................... H05B 6/02; B23K 11/00
[52] U.S. Cl. .................................. 219/9.5; 219/10.41; 219/85.11; 219/57
[58] Field of Search ...................... 219/8.5, 9.5, 10.41, 219/10.43, 85 A, 67, 61.2, 57, 85.11

[56] References Cited

U.S. PATENT DOCUMENTS

| | | | |
|---|---|---|---|
| 2,528,758 | 11/1950 | King | 219/9.5 |
| 3,288,982 | 11/1966 | Suzuki et al. | 219/9.5 X |
| 3,385,948 | 5/1968 | Redmond | 219/137 R |
| 3,860,778 | 1/1975 | Rudd et al. | 219/67 |
| 4,192,984 | 3/1980 | Rudd | 219/9.5 X |
| 4,197,441 | 4/1980 | Rudd | 219/9.5 |

Primary Examiner—Philip H. Leung
Attorney, Agent, or Firm—Brooks Haidt Haffner & Delahunty

[57] ABSTRACT

Method and apparatus for depositing metal on, and bonding it to, a metal part or parts, either to provide hard facing metal on the metal part or to produce a cast weld between the parts. In the method, the metal to be deposited is melted before depositing it by an induction coil supplied with high frequency electrical current. The metal part or parts are advanced toward a point where such metal is deposited, and in advance of such point, the surface of the metal part, or for welding, the surfaces of the metal parts to be joined, are heated to melting temperature by high frequency electrical current. The high frequency current is supplied to such surface or surfaces by the same induction coil, by a separate induction coil or by contacts engaging the metal part or parts.

31 Claims, 7 Drawing Sheets

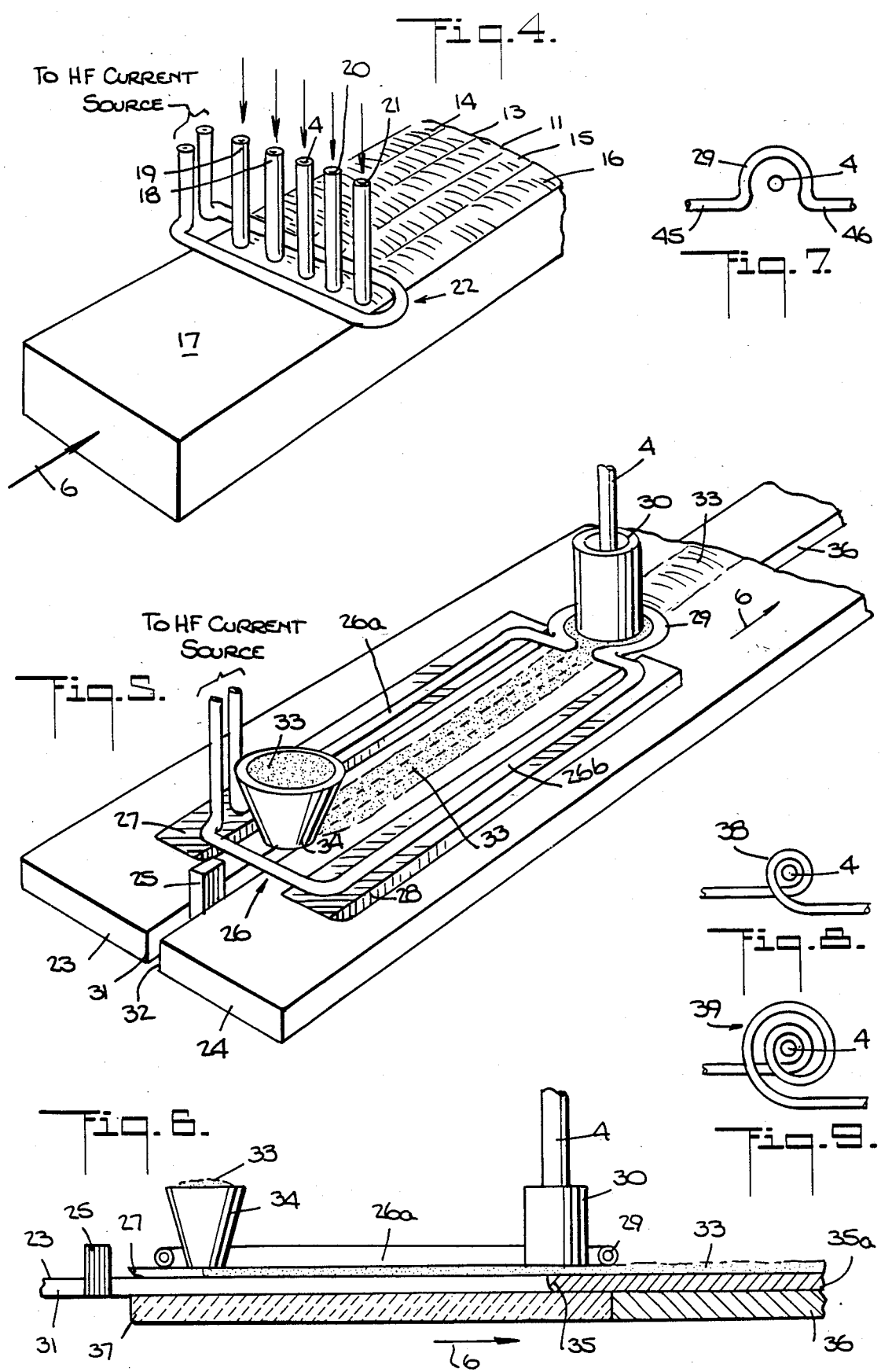

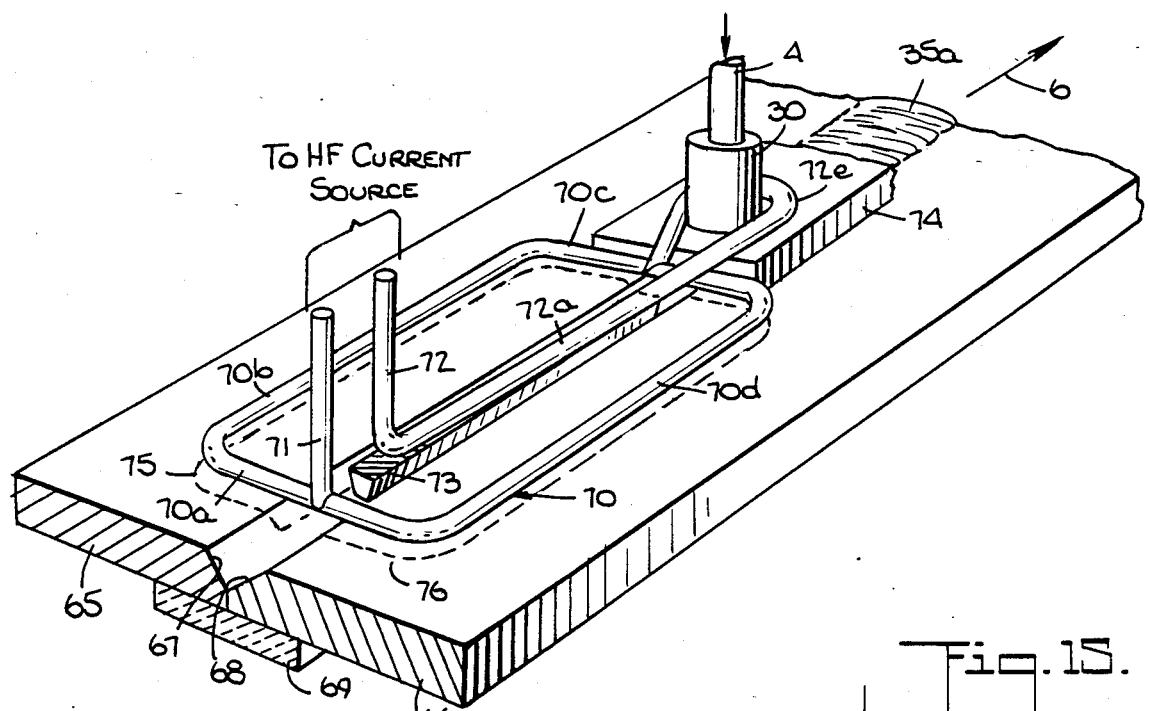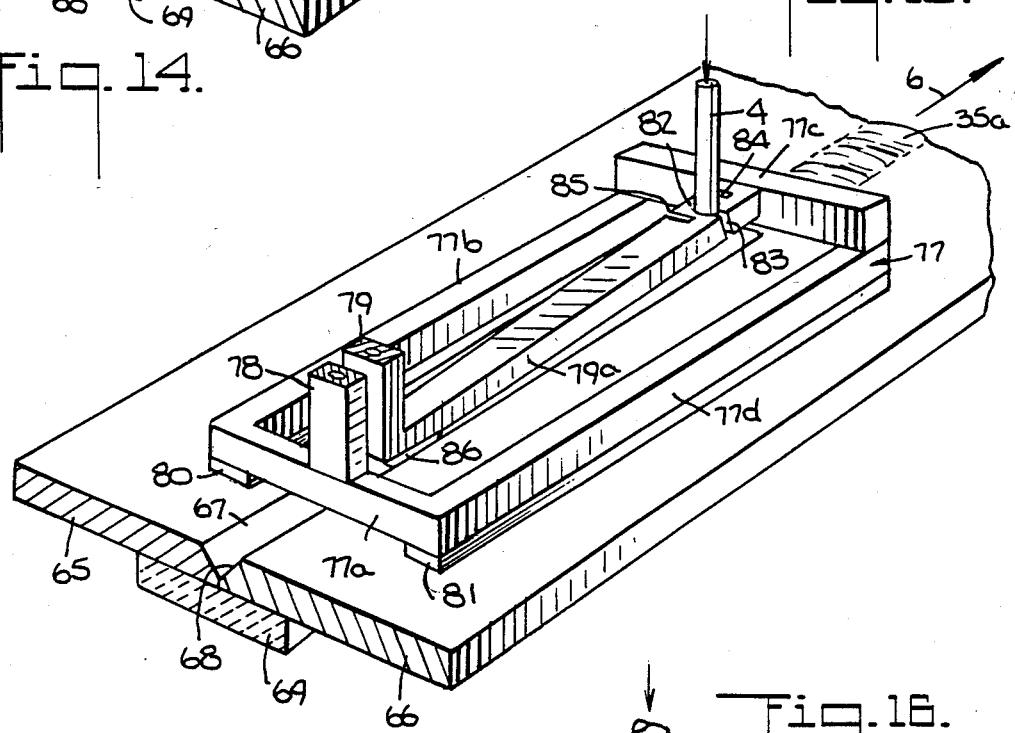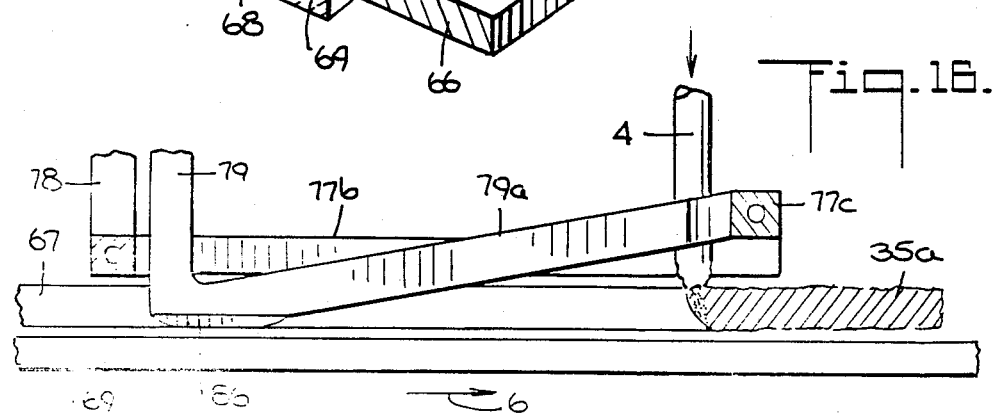

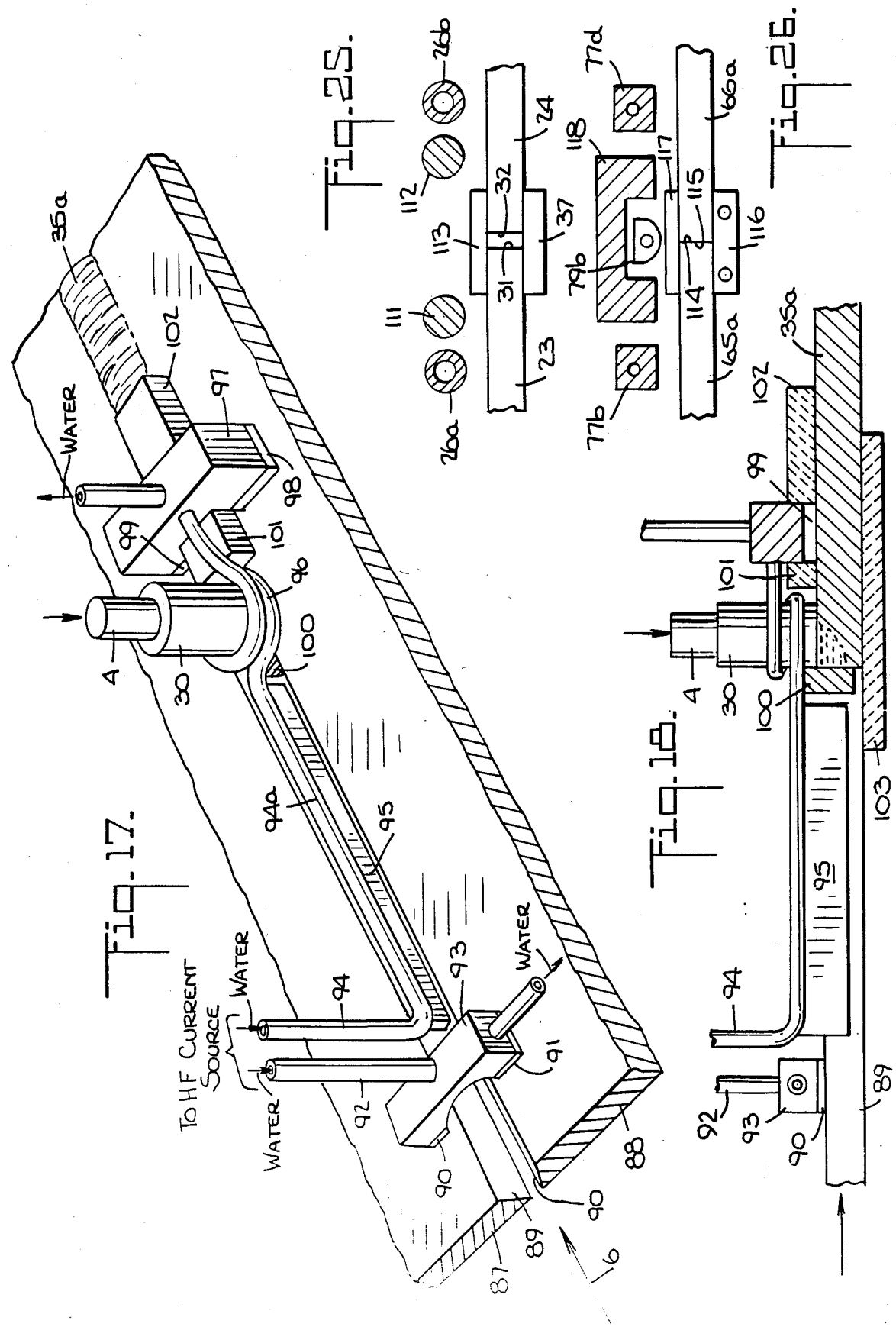

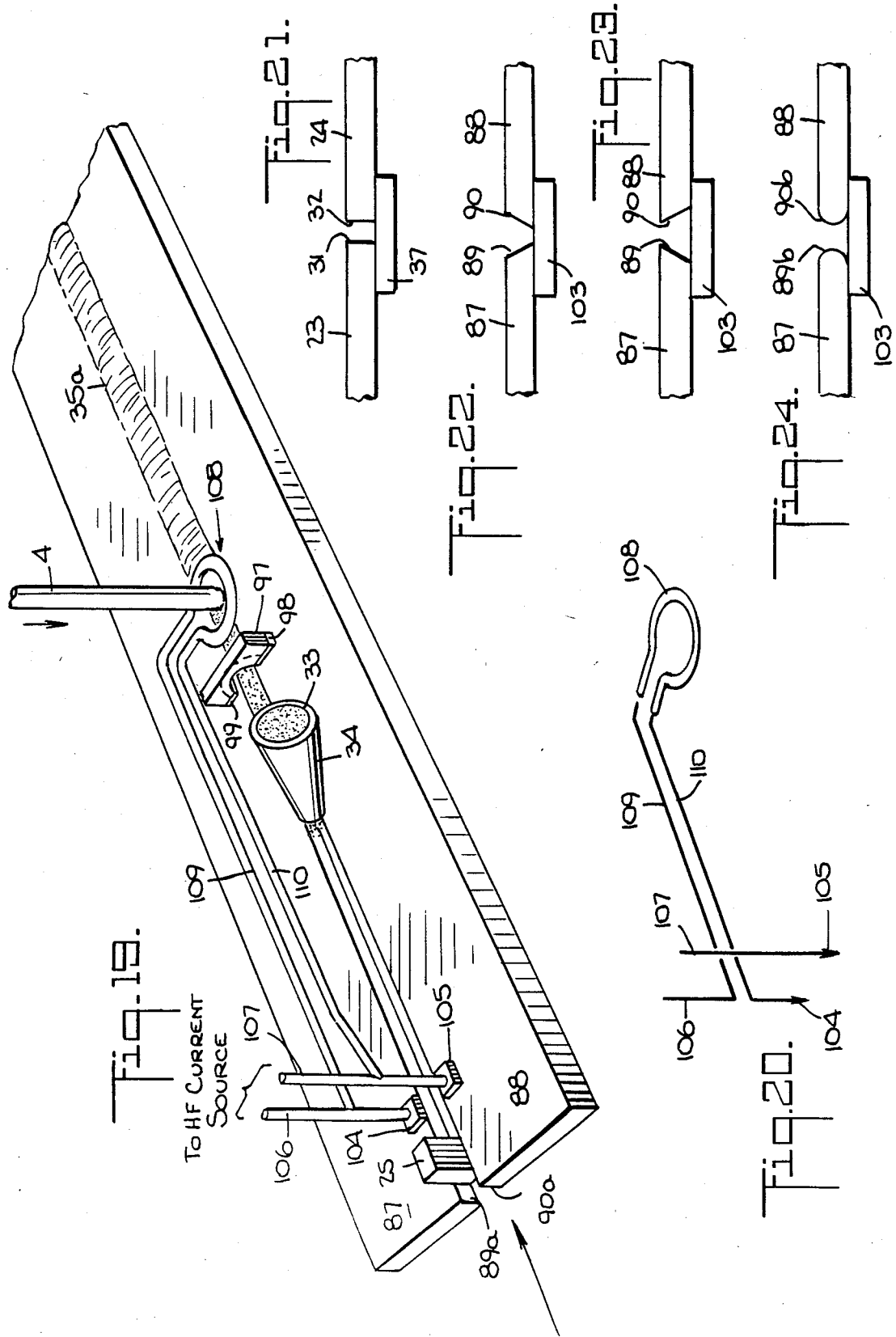

METHOD AND APPARATUS FOR HIGH FREQUENCY ELECTRICAL CAST WELDING AND SURFACE HARDENING

The present invention relates to the application of melted metal to the surface of a metal object and to the joint between a pair of metal edge surfaces, and particularly, to the deposit of a hard metal on the surface of a softer metal, known as hard facing, and to the welding together of a pair of adjacent metal edge surfaces with added metal, known as cast welding.

The welding together of a pair of metal edge surfaces by means of high frequency electrical current is known in the art. See, for example, U.S. Pats. Nos. 4,197,441; 3,037,105 and 2,876,323. In such welding, the facing surfaces to be welded together are heated to forge welding temperature, i.e., to a temperature below melting temperature, and are pressed together to form a weld. There is no addition of metal, and the weld is formed by metal of the parts. Although such welding is satisfactory for many purposes, problems arise in meeting certain characteristics for the weld, such as Charpy impact requirements, particularly when the metal parts being welded have a substantial thickness, e.g. ¼ inch or more. Such problems arise in the fabrication of large diameter pipe, spiral pipe, plate welding, the welding together of boiler tube fins, etc. Therefore, resort has been made to the use of submerged arc welding in which a consumable metal rod is fed in spaced relation to the parts being welded, and an electrical power source, usually of low frequency or direct current, is connected to the rod and the parts to produce an arc between the rod and the parts which is submerged in a flux.

However, arc welding is relatively slow in terms of the number of inches per minute of parts which can be welded. The speed of welding cannot be increased above a relatively low speed because the amount of current in the arc, one end of which heats and melts the end of the rod and the other end of which heats and melts metal of the parts to form a pool of molten metal beneath the rod, is limited by the size and conductivity of the rod and by the fact that the arc current produces a magnetic field which, by reason of the motor effect, will "blow" the molten metal beneath the rod away from the desired area if the current exceeds a value which permits only welding at a slow speed.

Melt welding together of contacting metal parts using high frequency current is disclosed in U.S. Pat. No. 3,860,778, but the methods disclosed therein have limitations similar to those described in connection with submerged arc welding in that there is a limitation on the welding current and the welding speed for a long continuous seam can be relatively slow. Furthermore, no metal is added to the weld seam.

The melting of the surface of a metal part by high frequency electrical current, and the deposit of a material which will alloy with the metal of the part in the molten metal is disclosed in U.S. Pat. No. 4,234,776. However, the added metal is heated after it is applied.

U.S. Pat. No. 3,497,662 discloses the welding together of a pair of parts being advanced by feeding a filler strip between the parts in advance of the weld point and heating the strip and the parts to forge welding temperature with electrical current supplied to the strip and the parts in advance of the weld point. While filler metal is used, the parts are forge welded rather than by means of molten metal.

U.S. Pat. No. 3,385,948 discloses the use of electrical current and a welding rod to form a weld seam between a pair of advanced metal parts. The welding rod is disposed so as to extend between the parts to be welded and so that the current flowing on the parts to be welded in advance of the weld point flows through the rod. However, with such a method, it is difficult to control the current passing through the end of the rod, and heating and melting of the rod is caused mainly by the molten metal of the parts causing the speed of welding to be relatively slow.

One object of the invention is to increase the speed of cast welding and hard facing of metal parts to several times the speed of such welding and hard facing which can be obtained with prior art methods.

A further object of the invention is to permit independent control of the melting of the added metal and the melting of the parts to which the metal is to be added.

In accordance with the invention, the metal surface or surfaces to be melted are heated to melting temperature by high frequency electrical current supplied thereto by means of an induction coil adjacent such surface or surfaces or by means of contacts, and the metal to be added is also melted by high frequency electrical current induced therein by an induction coil adjacent thereto. Preferably, to provide the advantages of high frequency electrical current heating, the current has a frequency of at least 50 KHz and most preferably, at least 100 KHz.

In the preferred apparatus of the invention, the metal to be added is at least partly encircled by an induction coil which is electrically connected to the apparatus used for melting the surface or surfaces of the parts to which the metal is to be added.

Other objects and advantages of the present invention will be apparent from the following detailed description of the presently preferred embodiments thereof, which description should be considered in conjunction with the accompanying drawings in which:

FIG. 4 is a diagramatic, perspective view of an embodiment of the invention for simultaneously applying a plurality of strips of hard facing metal to a strip of metal being advanced;

FIG. 5 is a diagramatic, perspective view of an embodiment of the invention for welding together two strips of metal as they are advanced;

FIG. 6 is a side elevation view, partly in section, of the embodiment shown in FIG. 6;

FIG. 7 is plan view of the heating loop and the welding rod shown in FIGS. 5 and 6;

FIG. 8 is a plan view which illustrates a modified, one-turn heating loop which can be used in place of the welding rod heating loop shown in FIGS. 5–7;

FIG. 9 is similar to FIG. 8 but illustrates a modified, two-turn heating loop which can be used in place of the welding rod heating loop shown in FIGS. 5–7;

FIG. 14 is similar to FIG. 5 and illustrates a modified embodiment of the heating coil for the welding together of a pair of strips;

FIG. 15 is similar to FIG. 14 and illustrates a modified form of the coil shown in FIG. 14;

FIG. 16 is a side elevation view, partly in cross-section of the embodiment shown in FIG. 15;

FIG. 17 is similar to FIG. 14 and illustrates a modified form of the heating coil;

FIG. 18 is a side elevation view, partly in cross-section of the embodiment shown in FIG. 17;

FIG. 19 is similar to FIG. 5 and illustrates the use of to supply heating current to the strips to be welded together;

FIG. 20 illustrates schematically a modification of the electrical heating apparatus shown in FIG. 19;

FIGS. 21-24 are end views illustrating various configurations of the edge surfaces of the strips which can be used in welding strips together;

FIGS. 25 and 26 are end views, partly in cross-section, illustrating the use of magnetic members to increase the current concentration and ceramic members to confine the molten metal in previously illustrated embodiments;

Figure 1:
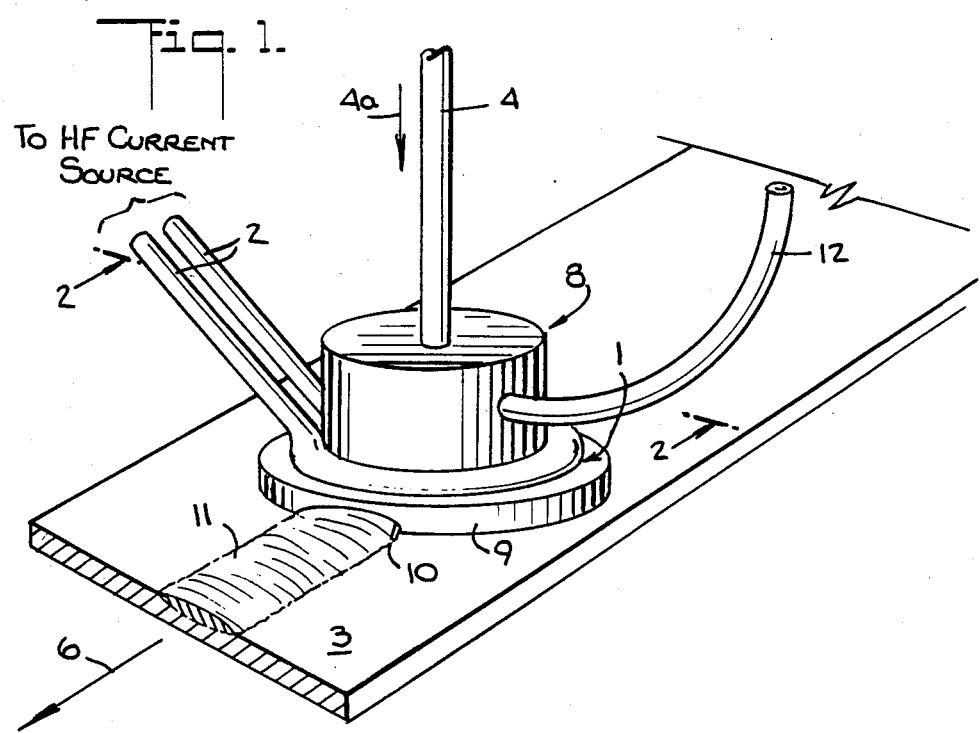
FIG. 1 is a diagramatic, perspective view of an embodiment of the invention in which hard facing metal is applied to the surface of a sheet of metal being advanced.

Several embodiments of the invention are shown in the drawings, and the general principle in each of them is that heating current is supplied to the part to be hard faced or the parts to be welded together by a coil or contacts in sufficient magnitude to cause them to melt at their surfaces and a coil or loop in electrical circuit with said coil or contacts at least partly encircles a rod of metal which is to provide the hard facing material or weld metal and melts the rod so that metal thereof merges with the melted metal of the part or parts to provide, upon cooling, the hard facing metal on such part or a weld between such parts.

Figure 2:
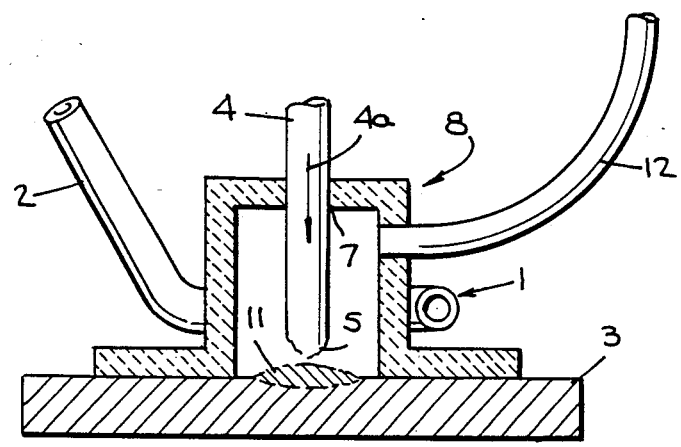
FIG. 2 is a cross-section of the embodiment shown in FIG. 1 and is taken along the line 2—2 shown in FIG. 1.

In the embodiment in FIGS. 1 and 2, a substantially one-turn coil or loop 1 connected to a high frequency current source (not shown) of a known type by leads 2 both heats a portion of the surface of the metal sheet 2 to melting temperature and melts the metal rod 4 at its end 5 as the sheet 3 is advanced in the direction of the arrow 6 by known means, and the rod 4, with or without a coating of flux, is fed in the direction of the arrow 4a through a top opening 7 in a high temperature ceramic hat 8, e.g. formed of silicon nitride, which rests on, or is slightly spaced from, the upper surface of the sheet 3. The flange 9 has a cut away portion 10 to permit the passage of the metal 11 provided by the rod 4 which has combined or merged with the molten metal of the sheet 3.

For hard facing, the metal of the rod 4 will be different from and harder than the metal of the sheet 3 but compatible therewith and can be selected in a manner well known to those skilled in the art. However, it will be apparent that if desired, the metal of the rod 4 can be the same as or softer than the metal of the sheet 3. A ceramic tube may be substituted for the rod 4, and a metal, hard facing powder can be fed through such tube to adjacent the upper surface of the sheet 3 where it will become molten and combine with the molten metal at the upper surface of the sheet 3.

If desired, or necessary, a welding flux of a known type or an inert gas may be fed to the interior of the hat 8 by way of a tube 12.

Accordingly, as the metal sheet 3 is advanced in the direction of the arrow 6, metal of the sheet 3 within the coil or loop 1 and the hat 8 will be melted, and at the same time metal at the end of the rod 4, which is also fed in the direction of the arrow 4a, will be melted forming a small pool of molten metal of the sheet 3 and the rod 4 below the end of the rod 4, such metal cooling as it exits from the hat 4. Thus, a strip of metal 11, the upper portion of which is substantially all metal of the rod 4, will be formed on the upper surface of the sheet 3 and will be secured to the sheet 3 by at least metal of the sheet 3.

It will be observed that the end of the rod 4 is melted by current induced therein by the coil or loop 1 and is not caused to melt by either an arc between the rod 4 and the sheet 3 or the molten metal of the sheet 3. Therefore, the sheet 3 can be advanced much more rapidly than it can with prior art methods, such as by arc melting or reliance on melting of the rod 4 by the molten metal of the sheet 3.

Figure 3:
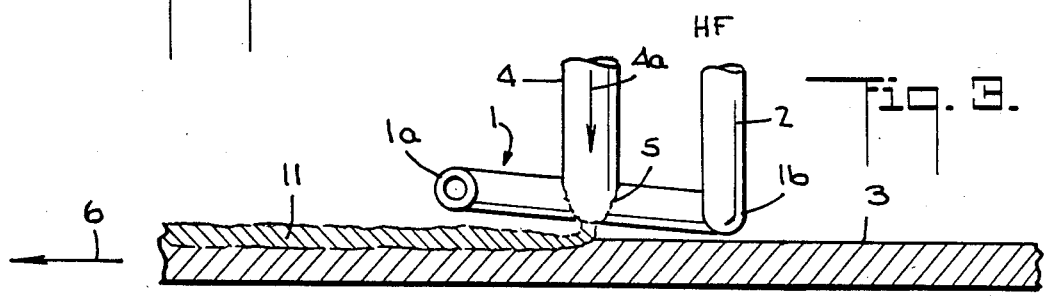
FIG. 3 is a diagramatic, side elevation view, partly in cross-section, of a further embodiment of the invention for applying hard facing metal to the surface of a sheet of metal being advanced.

It is known in the art that the spacing between an electrical current inducing coil and the part in which the current is being induced determines the current density in, and hence, the rate of heating of, such part. Thus, the closer the spacing, the greater the current density and vice versa. Furthermore, if the metal is molten, it is more likely to be expelled, by the "motor effect", if the current density is high, and once the molten metal of the rod 4 and of the sheet 3 have been combined, it is not necessary to maintain the melting temperature thereof. Accordingly, in the embodiment shown in FIG. 1 and in embodiments described hereinafter, it may be desirable to decrease the current density in the metal downstream of the end 5 of the rod 4 to reduce the possibility of expulsion of the molten metal and to provide more room for the passage of the combined metals. To accomplish this, the portion of the heating coil or loop, such as the portion 1a of the coil or loop 1, downstream of the end 5 of the rod 4 may be spaced from the upper surface of the sheet 3 by a distance greater than the upstream portion of the coil or loop, such as the portion 1b of the coil or loop 1, as shown in FIG. 3.

FIG. 4 illustrates the simultaneous application of a plurality of strips 11, 13, 14, 15 and 16 of hard facing metal to a metal strip or member 17 using a plurality of metal rods 4, 18, 19, 20 and 21 and apparatus of the type described in connection with FIGS. 1 and 2. Thus, the coil or loop 22 corresponds to the coil or loop 1. A hat corresponding to the hat 8 is not shown in FIG. 4, but a similar hat of a modified shape can be included in the apparatus shown in FIG. 4.

FIGS. 5 and 6 illustrate the use of the method and apparatus of the invention for providing a cast weld between a pair of metal strips or members 23 and 24. In FIG. 5, the strips 23 and 24 are maintained in spaced relation in advance of the metal rod 4 by an insulating spacer 25, such as a block of silicon nitride, and a coil 26 with a pair of legs 26a and 26b overlies the upper surfaces of the strips 23 and 24, the leg 26a overlying the strip 23 and the leg 26b overlying the strip 24. The coil 26 is maintained in spaced relation to the strips 23 and 24 by a pair of spacers 27 and 28 of high temperature insulating material, such as silicon nitride, which rest on, or are slightly spaced from, the upper surfaces of the strips 23 and 24.

The coil 26 also has an extension 29 which substantially encircles a tube 30 of high temperature insulating material, e.g. silicon nitride, through which the metal rod 4 is fed. The portion of the coil 26 in advance of the extension 29 heats, in a well known manner, the facing edge faces 31 and 32 to melting temperature by the time they reach the rod 4, and the extension 29 induces heating current in the rod 4 raising the lower end thereof to melting temperature and causing molten metal thereof to fall into the space between the molten edge faces 31 and 32 of the strips 23 and 24. The tube 30 aids in preventing the expulsion of molten metal from beneath the rod 4 and prevents the extension 29 from engaging the rod 4.

If desired or necessary, conventional welding flux 33 in powder form can be supplied intermediate the faces 31 and 32 and in advance of the rod 4 by a conical feeder 34.

Thus, as the strips 23 and 24 are advanced in the direction of the arrow 6, the faces 31 and 32 thereof are maintained in spaced relation by the spacer 25 in advance of the rod 4. Current is induced in the upper surfaces of the strips 23 and 24 by the coil 26 and flows in closed paths on such surfaces and along the faces 31 and 32 heating the latter to melting temperature by the time they reach the rod 4. At the same time, the end of the rod 4 is heated to welding temperature because of current induced therein by the extension 29 of the coil 26 causing molten metal 35 of the rod 4 to drop between the molten metal of the faces 31 and 32 and merge therewith. After the molten metal leaves the rod 4, it cools forming a cast weld 35a between the strips 23 and 24.

To assist in cooling the molten metal and preventing it from falling from between the faces 31 and 32, a water-cooled bar 36 of copper can be disposed beneath, and in contact with, the lower surfaces of the strips 23 and 24 downstream of the rod 4.

To prevent the flux 33 and the molten metal from falling from between the faces 31 and 32, a strip 37 of high temperature insulating material, such as silicon nitride, can be disposed beneath, and in contact with, the lower surfaces of the strips 23 and 24 in advance of and beneath the rod 4 as shown in FIG. 6.

FIG. 7 illustrates in plan view the coil extension 29 and the rod 4 shown in FIGS. 5 and 6, and it will be observed that the extension 29 is a substantially closed loop. However, the extension may have one or more turns as illustrated in FIGS. 8 and 9. Thus, FIG. 8 illustrates an extension 38 of one turn, or a complete loop, and FIG. 9 illustrates an extension 39 of two turns. An increase in the number of turns increases the heating of the rod 4, and since the current flowing in the extensions 29, 38 or 39 is the same as the current in the legs 26a and 26b, changing of the number of turns and/or the spacing of the turns from the rod 4 provides a means for adjusting the heating of the rod 4.

Figure 10:
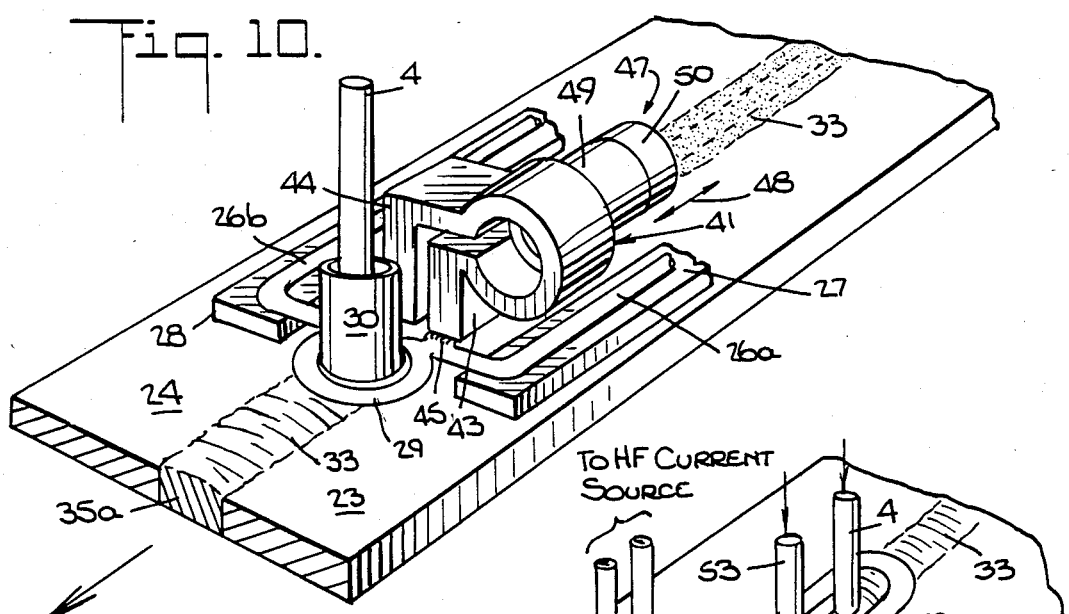
FIG. 10 is similar to FIG. 5 but is a modification of the embodiment shown in FIGS. 5 and 6 to include a reactor for adjusting the current in the welding rod heating loop.

The embodiment shown in FIG. 10 is the same as the embodiment shown in FIGS. 5 and 6 except that it illustrates the use of a variable reactor 41 for controlling the current in the extension 29 and shows the embodiment in FIGS. 5 and 6 from the opposite direction. FIG. 10 shows only a portion of the coil 26 and omits the showing of the flux feeder 34, the bar 26, the strip 37 and the spacer 25.

The reactor 41 is shown and described in U.S. Pat. No. 2,856,499 and comprises a loop portion 42 and a pair of legs 43 and 44. The legs 43 and 44 are conductively connected to the coil 26, such as by brazing, so that the loop portion 42 is electrically in parallel with the extension 29. The leg 43 is connected to the coil 26 at 45 and the leg 44 is connected to the coil 26 at 46 (see FIGS. 10 and 7). A core or slug 47 which is adjustable in the directions of the double-ended arrow 48 comprises a portion 49 of magnetic material, e.g. ferrite material, and a portion 50 of highly conductive material, e.g. copper. By movement of the core 47 in the directions of the arrow 48, the reactance of the reactor 41, and hence, the division of the current between the extension 29 and the reactor 41 and the heating of the rod 4, can be adjusted. Of course, the reactor 41 can be used with the other embodiments described in this application for adjusting the heating of the weld metal rod or rods.

Figure 11:
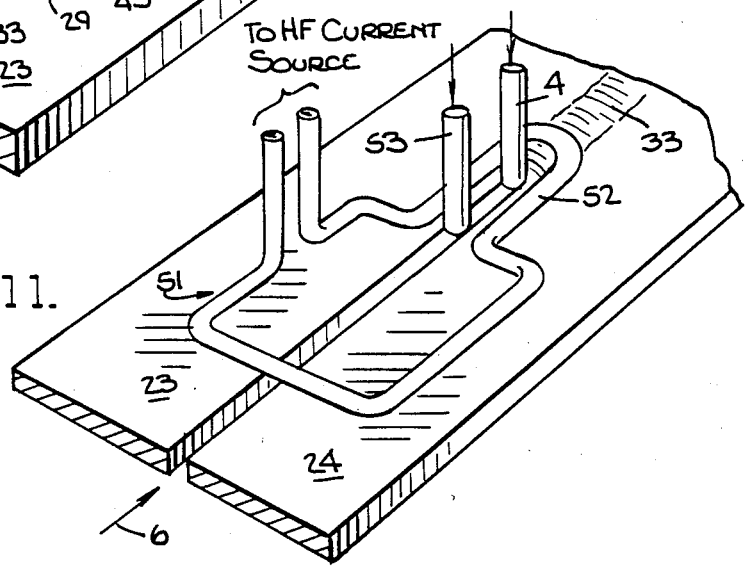
FIG. 11 is a diagramatic, perspective view of a further embodiment of the invention for welding together two strips of metal as they are advanced.

FIG. 11 is similar to FIG. 5 and illustrates an alternative embodiment of the apparatus shown in FIG. 5 for using more than one rod of weld metal. Although components shown in FIG. 5, such as the spacer 25, the flux feeder 34, the strip 37 and the bar 36 have been omitted in FIG. 11 for ease in illustration, such components can be included in the embodiment shown in FIG. 11.

In FIG. 11, the coil 51 has an elongated extension 52 which substantially encircles two rods 4 and 53 of weld metal. With further elongation of the extension 52, the number of weld metal rods can be increased. The embodiment shown in FIG. 11 operates in the same manner as the embodiment shown in FIG. 5 except that by the use of a plurality of weld metal rods, the amount of molten weld metal from the weld metal rods per unit of time can be increased.

Figure 12:
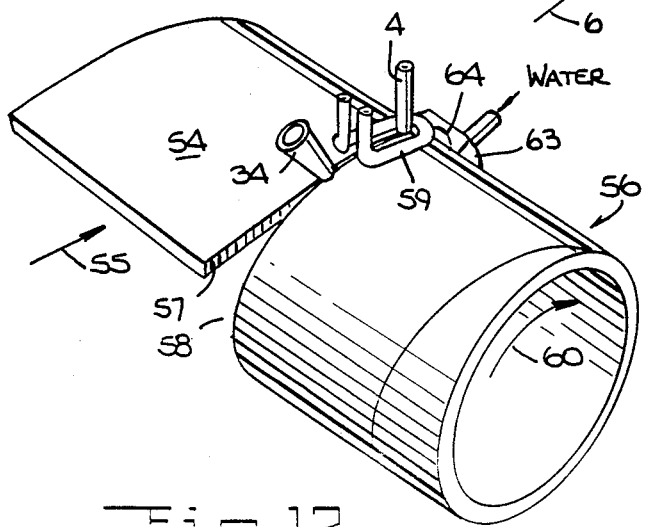
FIG. 12 illustrates in diagramatic perspective view the use of the invention to weld together the edges of strip to form tubing.
Figure 13:
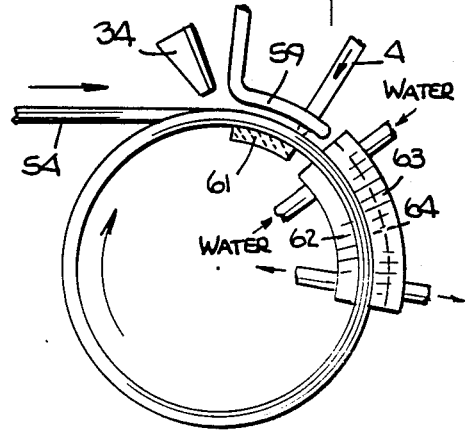
FIG. 13 is an end view of the embodiment shown in FIG. 12.

FIGS. 12 and 13 illustrate the application of the principles of the invention to the welding together of the edge portions of a sheet 54 of metal being advanced in the direction of the arrow 55 and bent to form a tube 56 which rotates in the direction of the arrow 60. One edge face 57 of the sheet 54 and the edge face 58 are heated to melting temperature as they reach the weld metal rod 4 by the current caused to flow therein by the coil 59, in the manner described hereinbefore, and the weld metal rod 4 is heated to melting temperature at its end by the coil 59. Welding flux is supplied through the flux feeder 34, flux and molten metal are prevented from falling out from between the faces 57 and 58 by a strip 61 corresponding to the strip 37 (FIG. 6) and the molten metal is cooled by a pair of water-cooled, arcuate metal shoes 62 and 63, e.g. copper shoes, which engage the inner and outer surfaces of the tube 56. The outer shoe 63 has an arcuate groove 64 extending in the direction of movement of the weld metal for the passage of the weld metal with the flux thereon.

The operation of the embodiment shown in FIGS. 12 and 13 is as described hereinbefore, namely, the coil 59 induces current in the sheet 54 and the rod 4 causing melting of the adjacent edge portions of the sheet 54 by the time they are below the end of the rod 4 and melting of the end of the rod 4, the melted metal of the rod 4 being deposited on the molten metal of said edge portions.

FIG. 14 illustrates a modification of the embodiment shown in FIGS. 5 and 6 in which a cast weld is produced between a pair of metal strips or sheets 65 and 66 in abutting relation and having chamfered edge faces 67 and 68 which are supported by a strip 69 of high temperature insulating material, e.g. silicon nitride, at least up to below the rod 4 as shown in FIG. 6.

The current inducing coil 70 differs from the coil 26 shown in FIG. 5 in that it is a complete loop having four legs 70a–70d. High frequency electric current is fed to and returns from, the coil 70 by a lead 71 connected to the center of the leg 70a and by a lead 72 which has a portion 72a with a shaped conductive member 73 secured thereto, e.g. by brazing, and which fits within the space between the faces 67 and 68 in spaced relation thereto to act as a proximity conductor and cause the induced current to follow paths on the faces 67 and 68.

The lead 72 also has an extension 72e corresponding to the extension 29 in FIG. 5 which substantially encircles the tube 30 of insulation and hence, the weld metal rod 4, for causing melting of the lower end of the rod 4. The end of the extension 72e is conductively connected to the center of the leg 70c. A plate or strip 74 of high temperature insulating material overlies the weld metal 35a and engages, or is slightly spaced from, the upper surfaces of the strips 65 and 66 and supports the tube 30.

If desired or necessary, flux can be fed between the faces 67 and 68 and the weld metal can be cooled as with previously described embodiments.

One advantage of the embodiment shown in FIG. 14 is that it does not rely solely on the proximity of the faces to be welded together to cause the current to flow on such faces and the strips 65 and 66 can abut below the faces 67 and 68. Also, such embodiment is especially useful for welding together relatively thick strips or sheets. The paths of the induced current in the strips 65 and 66 are indicated by the dotted lines 75 and 76, and it will be observed that such induced current flows in two loops. The current in one loop indicated by the dotted line 75 flows beneath the leg 70b and portions of the legs 70a and 70c and along the face 67. The current in the other loop flows beneath the leg 70d and portions of the legs 70a and 70c and along the face 68. By reason of such current flow, the currents flow in the same direction on the faces 67 and 68, the metal of the strips 65 and 66 at the faces 67 and 68 is heated to melting temperature by the time they reach the lower end of the rod 4.

FIGS. 15 and 16 illustrate a modification of the current inducing coil 70 shown in FIG. 14 and except for the omission of the tube 30, the replacement of the extension 72e and the elimination of the member 73, the embodiment shown in FIGS. 15 and 16 can be the same, and operates the same, as the embodiment shown in FIG. 14.

The current inducing coil or induction coil, 77 shown in FIGS. 15 and 16 illustrates an embodiment of the coil 70 (FIG. 14) which makes it unnecessary to include the member 73 and an extension 72e. The coil 77 is formed of legs 77a–d which are rectangular or square in cross-section, although they also could have a circular or other cross-section, and the leads 78 and 79 may have a similar cross-section. The legs 77b and 77d are supported by strips 80 and 81 of high temperature insulating material which engage, or are slightly spared from, the upper surfaces of the strips 65 and 66.

The lead 79 has a portion 79a which is shaped to fit between the faces 67 and 68, at least at the portion thereof remote from the leg 77c. Thus, at the latter portion, it is between the faces 67 and 68 and slopes upwardly to the leg 77c to which it is conductively connected, and the portion 79a performs the function of the portion 72a and the member 73 (FIG. 14). Of course, the portion 79a may have a cross-section different from the cross-section of the coil 77 so that it more closely conforms to the shape of the groove defined by the faces 67 and 68.

The lead 79, instead of having an extension 72e as shown in FIG. 14, has an opening through the portion 79a, adjacent the leg 77c which is larger than the diameter of the rod 4 for permitting the rod 4 to pass therethrough. There is a notch 83 extending from the opening 82 and a pair of notches 84 and 85 at opposite sides of the opening 82 so that the portion of the portion 79a around the rod 4 corresponds to the extension 72e and acts to heat the lower end of the rod 4 to melting temperature.

To prevent conductive contact with the bottom of the groove defined by the faces 67 and 68, the lead 79 can have a shoe 86 of high temperature insulating material secured thereto as shown in FIG. 16.

In the embodiments described hereinbefore, the surfaces to be welded together and the lower end of the weld metal rod have been heated to melting temperature in advance of the weld metal rod by an induction coil. Such surfaces can also be so heated by high frequency current supplied thereto by means of contacts contacting the parts while the weld metal rod is so heated by an induction coil. FIG. 17 illustrates such latter embodiment.

In FIG. 17, a pair of metal strips or sheets 87 and 88, with chamfered edge portions providing edge faces 89 and 90 in separated relation, are engaged by a pair of conductively interconnected contacts 90 and 91 of a known type. The contacts 90 and 91 are connected to a terminal of a high frequency current source by a lead 92 and a conductive bridging member 93.

A lead 94, connected to the other terminal of the high frequency current source, has a portion 94a with a conductive member 95 conductively secured thereto, the member 95 fitting between the faces 89 and 90 and being spaced from the latter and performing the function of the member 73 (FIG. 14). At the rod 4, the lead 94 has a one-and-one-half turn loop 96 which encircles the tube 30 and hence, the weld metal rod 4, for heating the lower end of the rod 4 to melting temperature. The rod 4 need not be a solid rod, but can be a tubular metal rod with flux in its central bore or can be replaced by a tube of high temperature insulating material through which weld metal in compacted powder form can be fed.

The lead 94 is conductively connected to a second conductive bridging member 97 having a pair of contacts 98 and 99. As is known in the art, the current will flow between the contacts 90 and 99 mainly on the face 89 and between the contacts 91 and 98 mainly on the face 90 so that the metal at such faces 89 and 90 will be heated to melting temperature by such current, as the strips 87 and 88 are advanced in the direction of the arrow 6, by the time that they are below the rod 4.

To confine the molten metal, blocks and plates 100, 101, 102 and 103 of high temperature insulating material, e.g. silicon nitride, can be provided as shown in FIGS. 17 and 18.

If desired, to maintain the strips 87 and 88 separated in advance of the deposit of weld metal, a spacer like the spacer 25 (FIG. 5) can be provided between the strips 87 and 88 in advance of the bridging member 93.

A modification of the contacts and rod heating coil and their interconnection shown in FIGS. 17 and 18 is illustrated in FIG. 19, but the embodiment shown in FIG. 19 can otherwise be the same as the embodiment shown in FIGS. 17 and 18.

FIG. 19 shows a pair of contacts 104 and 105 engaging, respectively, the upper surfaces of the metal strips 87 and 88 and connected to a high frequency current source by a pair of leads 106 and 107. A bridging member 97 with a pair of contacts 98 and 99 also engages the upper surfaces of the strips 87 and 88 in advance of the weld metal rod 4. Thus, current flows mainly on the faces 89a and 90a between the contacts 104 and 105 and the contacts 98 and 99 to heat the metal at the faces 89a and 90a to melting temperature by the time they reach the lower end of the weld metal rod 4.

An induction coil 108, corresponding to the loop 96 shown in FIG. 17, substantially encircles the rod 4 and is connected to the leads 106 and 107 by leads 109 and 110 to provide current thereto for melting the lower end of the rod 4.

If desired or necessary, welding flux 33 can be supplied between the faces 80a and 90a by way of the flux feeder 34, the flux 33 being retained between the faces 80a and 90a by extending the plate 103 to the left as viewed in FIG. 18.

The current feed for the induction coil 108 may be modified as illustrated schematically in FIG. 20. Thus, the lead 106 may be interrupted and the leads 109 and 110 may be connected at opposite sides of the interruption to place the coil 108 electrically in series with the lead 106 and the contact 104 rather than in parallel with the current feed to the contacts 104 and 105.

In the previously described embodiments in which the faces to be welded together are separated in advance of the point where the metal of the rod 4 is deposited, the faces, such as the faces 31 and 32 (FIG. 5) or the faces 89a and 90a (FIG. 19) either lie in parallel planes which are perpendicular to the upper surfaces to the strips to be welded together, as illustrated in FIG. 21, or lie in intersecting planes which diverge in the upward direction as illustrated in FIG. 22. However, it is not necessary that they be rectilinear in cross-section or that they be so disposed. For example, as illustrated in FIG. 23, the planes in which the faces 89 and 90 lie may converge in the upward direction or the faces can be arcuate in cross-section, as illustrated by the faces 89b and 90b in FIG. 24.

To increase the amount of current induced in the parts to be welded, magnetic cores or bars can be disposed adjacent legs of the induction coil used to heat the parts in advance of where the weld metal is deposited.

FIG. 25 illustrates, with parts omitted for ease in illustration, a portion of the embodiment shown in FIG. 5 with magnetic cores 111 and 112, e.g. rods of ferrite, disposed adjacent the legs 26a and 26b to increase the current induced in the parts 23 and 24 and hence, caused to flow at the faces 31 and 32. FIG. 25 also illustrates the use of a top strip 113 of high temperature insulating material for assuring that molten metal at the edge faces 31 and 32 is retained between such faces.

FIG. 26 illustrates, with parts omitted for ease in illustration, a portion of an embodiment which is a modification of the embodiment shown in FIGS. 15 and 16. Thus, the strips 65a and 66a have parallel faces 114 and 115 rather than partly bevelled faces and are supported by a water-cooled metal bar 116 to limit the depth of melting. A melted metal confining strip 117 overlies the melting zone and the portion 79b, which corresponds to the portion 79a shown in FIG. 15, is arcuate at its lower side. However, the principles illustrated by FIG. 26 are also applicable to the embodiment shown in FIGS. 15 and 16.

In FIG. 26, the portion 79b is partly encircled by an inverted U-shaped magnetic member 118, e.g. a member made of ferrite, to increase the current induced in the strips 65a and 66a and hence, the current flowing where such strips abut.

Figure 27:
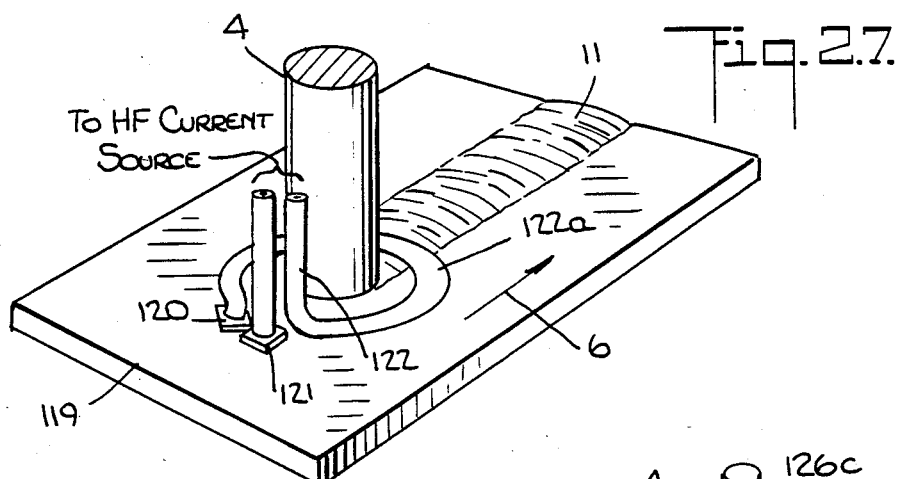
FIG. 27 is a diagramatic perspective view illustrating a modification of the embodiment shown in FIGS. 1 and 2 for hard facing of a metal sheet or strip.

FIG. 27 illustrates a modification of the embodiment shown in FIG. 1 in which the heating current is supplied to the metal strip 119 to be hard faced by a pair of contacts 120 and 121 which engage the strip 119, and the weld metal rod 4 is heated by a portion 122a of the lead 122 which is connected to the contact 120. While the portion 122a does not completely encircle the rod 4, it may be considered substantially to encircle the rod 4.

As is known in the art, the portion 122a acts as a proximity conductor and causes, depending on the spacing of the portion 122a from the surface of the strip 119, and the current frequency, substantially all of the current to flow in the strip 119 beneath the portion 122a rather than along the shortest path between the contacts 120 and 121. Therefore, the metal of the strip 119 within the portion 122a and the lower end of the rod 4 can be heated to melting temperature, current being induced in the rod 4 by the portion 122a, to cause merging of the molten metal of the rod 4 and of the strip 119 as the strip 119 is advanced in the direction of the arrow 6. Of course, a hat and flux or inert gas can be used in this embodiment in the same manner that they are used in the embodiment shown in FIG. 1.

Figure 28:
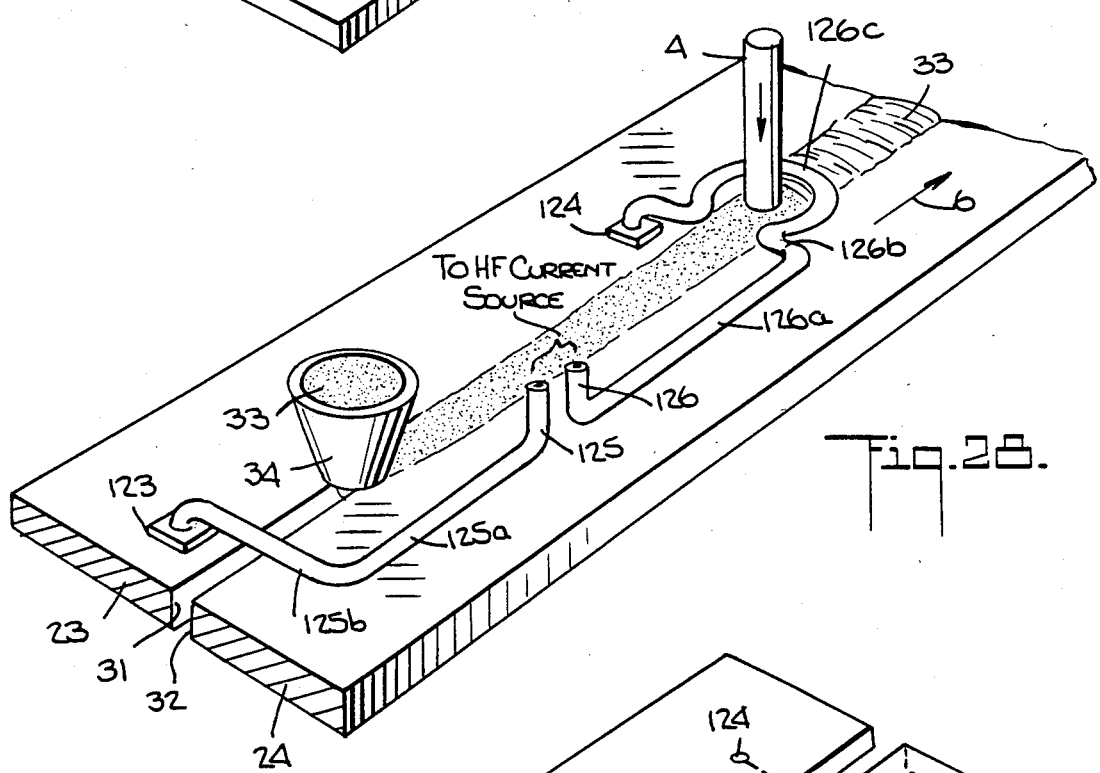
FIG. 28 is similar to FIG. 27 and illustrates a modification of the apparatus shown in FIG. 27 for the welding together of metal strips.

FIG. 28 illustrates an embodiment similar to the embodiments shown in FIGS. 27 and 5 for the production of a cast weld between the metal strips 23 and 24, the current for melting the metal at the face 31 being supplied by means of contacts 123 and 124 engaging the upper surface of the metal strip 23. In FIG. 28, a lead 125 is connected to one terminal of a high frequency current source and to the contact 123 and a lead 126 is connected to the other terminal of such source and to the contact 124. The lead 125 has portions 125a and 125b which act as proximity conductors and inducers of current in the surface of the strip 24. The lead 126 has portions 126a and 126b which act as proximity conductors and inducers of current in the surface of the strip 24 and has a portion 126c which substantially encircles the weld metal rod 4 and corresponds to the coil extension 29 (FIG. 5). Of course, the strip 37 and the water cooled copper bar 26 shown in FIG. 6 can be included in the embodiment shown in FIG. 28.

Figure 29:
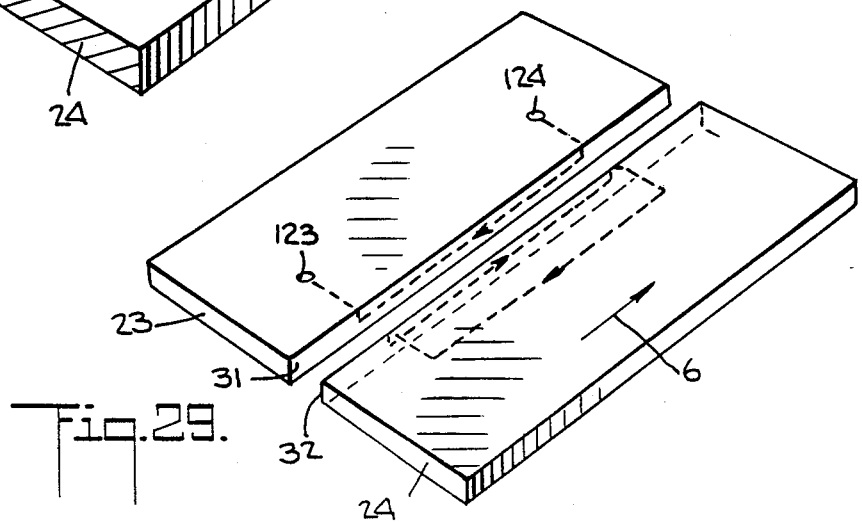
FIG. 29 illustrates diagramatically the paths of the current flow with the apparatus shown in FIG. 28.

FIG. 29 illustrates in dotted lines and schematically the current paths obtained with the embodiment shown in FIG. 28. Thus, the electrical current between the contacts 123 and 124 flows mainly at the face 31 due to the proximity effect between the currents at the faces 31 and 32 and the electrical current on the strip 24 flows in a path in the shape of a loop, one portion of which is at the face 32 nearest the face 31. In this way, the metal at the faces 31 and 32 is brought to melting temperature by the time they are below the rod 4 and as they are advanced in the direction of the arrow 6.

The lead portion 126c, substantially encircling the weld metal rod 4, induces current therein of a magnitude sufficient to cause the lower end thereof to melt. Accordingly, molten metal of the rod 4 merges with molten metal at the faces 31 and 32 and when cooled, creates a cast weld between the strips 23 and 24.

Of course, the use of multiple turn coils around the rod 4, as described hereinbefore, can be used in the various embodiments to adjust the current induced in the weld metal rod 4 or weld metal in the form of powder. Also, the current adjusting reactor 41 described in connection with FIG. 10 can be used in the various embodiments to adjust the current in the weld metal.

Also, as will be apparent to those skilled in the art, cooling of various components, such as the coils, is used as necessary and in a conventional manner.

Although preferred embodiments of the present invention have been described and illustrated, it will be apparent to those skilled in the art that various modifications may be made without departing from the principles of the invention.

I claim:

1. A method of welding together a pair of metal parts at their edge surfaces with weld metal deposited at a predetermined point in which method said parts are advanced in a predetermined direction to and beyond said point with edge surfaces thereof in facing but spaced relation, said method comprising:
   at said point, melting weld metal to be deposited by inducing a high frequency electrical current therein with an induction coil energized by said current and depositing the molten weld metal on said surfaces;
   heating the metal at said surfaces upstream of said point by causing high frequency electrical current to flow along said surfaces with additional current supplying means in addition to said induction coil and disposed upstream of said point, the current flowing along said surfaces being selected to cause the metal at said surfaces to melt by the time said surfaces are advanced to said point, whereby the weld metal is deposited on molten metal of said surfaces; and
   downstream of said point, cooling the melted metal and the metal at said surface which has been heated to melting temperature.

2. A method as set forth in claim 1 wherein said weld metal to be deposited extends longitudinally of an axis and has a surface extending peripherally of said axis, wherein said metal to be deposited is fed toward said point in the direction of said axis, wherein said high frequency electrical current is caused to flow along said surfaces by inducing said current in said metal part in advance of said point and wherein said induction coil at least partially encircles and is spaced from said peripheral surface of said metal to be deposited.

3. A method as set forth in claim 2 further comprising supplying a flux to the metal at said point.

4. A method as set forth in claim 2 further comprising flowing an inert gas over the metal at said point.

5. A method as set forth in claim 2 wherein said metal to be deposited is an elongated rod of the last-mentioned said metal and said rod is fed toward said point in the direction of its length and is melted at its end adjacent the melted metal of said surfaces.

6. A method as set forth in claim 1 wherein said weld metal to be deposited extends longitudinally of an axis and has a surface extending peripherally of said axis, wherein said metal to be deposited is fed toward said point in the direction of said axis, wherein said induction coil at least partially encircles and is spaced from said peripheral surface of said metal to be deposited, wherein said current is supplied through said coil to a first contact engaging at least one of said metal parts upstream of said point and to a second contact spaced from said first contact and said point and engaging at least one of said metal parts, and wherein the magnitude of a high frequency current flowing between said first contact and said second contact is selected to cause melting of said metal parts at said surfaces by the time they are advanced to said point and the magnitude of the high frequency current flowing in said coil is selected to cause melting of said metal to be deposited prior to engagement thereof with the molten metal of said surfaces.

7. A method as set forth in claim 1 wherein the edge surface of one of said metal parts is maintained in spaced relation to the edge surface of the other of said parts downstream of said point and said metal to be deposited is supplied in a volume sufficient to fill the space intermediate the surfaces.

8. A method as set forth in claim 1 wherein the edge surface of one of said metal parts is brought into abutting relation with the edge surface of said other of said metal parts at said point.

9. A method as set forth in claim 1 wherein the edge surface of one of said metal part adjoins a further surface of said one metal part and the edge surface of the other metal part adjoins a further surface of said other metal part and wherein during the advance of said metal parts, said further surface of said one metal part is maintained in abutting relation with said further surface of said other metal part.

10. A method as set forth in claim 1 wherein said metal to be deposited extends longitudinally of an axis and has a surface extending peripherally of said axis, wherein said metal to be deposited is fed toward said point in the direction of said axis and wherein said induction coil has a portion at least partially encircling and spaced from said peripheral surface of said metal to be deposited and wherein said additional current supplying means comprises a pair of spaced conductors in electrical series with said portion of said induction coil, one of said conductors being adjacent, spaced from and overlying one of said metal parts in advance of said point and the other of said conductors being adjacent, spaced from and overlaying the other of said metal parts in advance of said point, wherein said current is supplied to said coil through said conductors.

11. A method as set forth in claim 10 wherein said current is supplied to said coil through said conductors so that at any given time, the current flow in one said conductor is opposite to the current flow in the other said conductor.

12. A method as set forth in claim 10 wherein said current is supplied to said coil through said conductors so that at any given time the current flow in both conductors is the same direction.

13. A method as set forth in claim 12 said conductors extend substantially parallel to said predetermined direction wherein said conductors are conductively interconnected adjacent said point by a first further conductor and are conductively interconnected by a second further conductor upstream of said point and wherein said current is fed to said second further conductor upstream of said point and intermediate said conductors and is fed to said first further conductor adjacent said point and intermediate said conductors through said portion of said coil.

14. A method as set forth in claim 13 wherein said current is fed to said first further conductor adjacent said point through a conductor extending from adjacent said second further conductor upstream of said point to said portion of said coil and overlying the space between the surface of one of said metal parts and the surface of the other of said metal parts but spaced from each said surface.

15. A method as set forth in claim 1 wherein said metal to be deposited extends longitudinally of an axis and has a surface extending peripherally of said axis, wherein said metal to be deposited is fed toward said point in the direction of said axis and wherein said additional current supplying means is a plurality of contacts spaced from each other in said predetermined direction of advance and engaging at least one of said metal parts, a first one of said contacts being disposed adjacent said point and a second one of said contacts being disposed upstream of said point and said induction coil at least partially encircles said metal to be deposited and is spaced from said peripheral surface of the last-mentioned said metal and supplying said current to said induction coil and to said contacts.

16. A method as set forth in claim 15 wherein said current is supplied to said first one of said contacts through said coil and through a conductor extending from adjacent said second one of said contacts and overlying the space between said surface of one of said metal parts and said surface of the other of said metal parts, but spaced from each said surface.

17. A method as set forth in claim 16 wherein each of said contacts is in contact with both of said metal parts for supplying current to both of said metal parts.

18. A method as set forth in claim 15 wherein said second one of said contacts is in contact with one of said metal parts and a third one of said contacts is upstream of said point adjacent said second one of said contacts and is in contact with the other of said metal parts and wherein said current is supplied to said second one of said contacts and said third one of said contacts and to said induction coil in electrical parallel.

19. A method as set forth in claim 15 wherein said second one of said contacts is in contact with one of said metal parts and a third one of said contacts is upstream of said point adjacent said second one of said contacts and is in contact with the other of said metal parts and wherein said current is supplied to said second one of said contact through said induction coil and to said third one of said contacts.

20. A method as set forth in claim 15 wherein said first one of said contacts and said second one of said contacts are both in contact with one of said metal parts and said current is supplied to said first one contact through said induction coil by a conductor overlying and spaced from the other of said metal parts and to said second one of said contacts through a conductor overlying and spaced from said other metal part.

21. Apparatus for welding together a pair of metal parts being advanced in a predetermined direction, said apparatus comprising:
a body of weld metal disposed adjacent a predetermined point, said body having an end;
a pair of metal parts with facing and closely spaced but separated edge surfaces being advanced with said surfaces passing said point in spaced relation to said end;
a high frequency heating means in the form of an induction coil having a portion at least partially encircling said body adjacent said end and in spaced relation thereto;
additional high frequency heating means in addition to said coil in advance of said point for heating metal at said surfaces to melting temperature as they are advanced to said point; and
a source of high frequency current connected to said coil and to said additional high frequency heating means and heating said surfaces and said body to melting temperature at said point.

22. Metal depositing means as set forth in claim 21 further comprising a non-conducting hat intermediate said induction coil and said body and encircling said body and means for supplying a molten metal protecting material to the interior of said hat.

23. Apparatus as set forth in claim 21 wherein said additional high frequency heating means comprises a pair of conductors, one of said conductors overlying and spaced from one of said metal parts is advance of said point and the other of said conductors overlying and spaced from the other of said metal parts in advance of said point and wherein said high frequency electrical current source is connected to said portion of said induction coil by said conductors.

24. Apparatus as set forth in claim 23 wherein said conductors are respectively conductively interconnected at their adjacent ends and to a first portion of the portion of said induction coil which at least partially encircles said body at the end thereof nearer said point and further comprising a conductor overlying the space between said surfaces of said metal parts and spaced from each said surface and extending from adjacent the ends of said conductors farther from said point to a second portion of said portion of said induction coil which at least partially encircles said body, and wherein said high frequency electrical current source is connected to said portion of said induction coil which at least partially encircles said body by said conductors and the last-mentioned said conductor.

25. Apparatus as set forth in claim 21 wherein said additional high frequency heating means comprises a plurality of contacts spaced from each other in said direction and engaging at least one of said metal parts, a first one of said contacts being disposed adjacent said point and a second one of said contacts being disposed upstream of said point and wherein said high frequency current source is connected to said second one of said contacts and is connected to said portion of said induction coil through a conductor overlying the space between the surfaces of said metal parts but spaced from each said surface and extending from adjacent said second contact to a first portion of said portion of said induction coil, a second portion of said portion of said induction coil being conductively connected to said on of said contacts.

26. Apparatus as set forth in claim 25 wherein said first one of said contacts and said second one of said contacts both engage one of siad metal parts, wherein there is a third one of said contacts adjacent and conductively connected to said first one of said contacts and engaging the other of said metal parts and there is a fourth one of said contacts adjacent and conductively connected to said second one of said contacts and engaging said other of said metal parts.

27. Apparatus as set forth in claim 21 wherein said additional high frequency heating means comprises a plurality of contacts spaced from each other in said direction and engaging at least one of said metal parts, a first one of said contacts being disposed adjacent said point and a second one of said contacts being disposed upstream of said point and both said first one and said second one of said contacts engaging said one of said metal parts, and wherein said high frequency current source is connected to said second one of said contacts through a conductor overlying and spaced from said other of said metal parts and is connected to said first one of said contacts through said portion of said induction coil and a further conductor overlying and spaced from said other of said metal parts.

28. Apparatus as set forth in claim 21 wherein said additional high frequency heating means comprises a plurality of contacts spaced from each other in said direction and engaging at least one of said metal parts, a first one of said contacts being disposed adjacent said point and a second one of said contacts being disposed upstream of said point and both said first one and said second one of said contacts engaging said one of said metal parts, wherein there is a third one of said contacts adjacent said second one of said contacts and engaging the other of said metal parts and a fourth one of said contacts adjacent and conductively connected to said one of said contacts and engaging said one of said metal parts and wherein said high frequency current source is electrically connected to said second one and said third one of said contacts and to said portion of said induction coil.

29. Apparatus as set forth in claim 28 wherein said portion of said induction coil is connected electrically in parallel with said second and said third one of said contacts.

30. Apparatus as set forth in claim 28 wherein said induction coil is connected electrically in series with one of said second and said third one of said contacts.

31. Apparatus as set forth in claim 21 wherein there are two contacts engaging said metal part upstream of said point and wherein said high frequency electrical current source is connected to one of said contacts and is connected to the other of said contacts through said portion of said induction coil.

* * * * *

UNITED STATES PATENT AND TRADEMARK OFFICE
CERTIFICATE OF CORRECTION

PATENT NO. : 4,906,805
DATED : March 6, 1990
INVENTOR(S) : Rudd

It is certified that error appears in the above-identified patent and that said Letters Patent is hereby corrected as shown below:

Col. 3, line 24, after "of" insert --contacts--;

Col. 12, line 55, "overlaying" should read --overlying--;

Col. 14, line 30, "is" should read --in--;

Col. 14, line 65, "on" should read --one--;

Col. 15, line 1, "siad" should read --said--.

Signed and Sealed this

Second Day of July, 1991

*Attest:*

HARRY F. MANBECK, JR.

*Attesting Officer*  Commissioner of Patents and Trademarks